March 7, 1939. A. J. BOCZ Re. 21,022

VIBRATION DAMPER

Original Filed Aug. 16, 1926 3 Sheets-Sheet 1

INVENTOR.
Alexander J. Bocz

March 7, 1939. A. J. BOCZ Re. 21,022

VIBRATION DAMPER

Original Filed Aug. 16, 1926 3 Sheets-Sheet 2

INVENTOR.
Alexander J. Bocz

March 7, 1939. A. J. BOCZ Re. 21,022

VIBRATION DAMPER

Original Filed Aug. 16, 1926 3 Sheets-Sheet 3

INVENTOR.
Alexander J. Bocz

Reissued Mar. 7, 1939

Re. 21,022

UNITED STATES PATENT OFFICE 21,022

VIBRATION DAMPER

Alexander J. Bocz, Detroit, Mich.

Original No. 1,756,898, dated April 29, 1930, Serial No. 129,379, August 16, 1926. Application for reissue September 16, 1937, Serial No. 164,245

3 Claims. (Cl. 74—604)

My invention relates to a new and useful balancer and dampener for engines, particularly engines of a type in which reciprocating and rotating parts are associated for the deliverance of power, such as in internal combustion engines and piston operated engines and such other type of mechanism, electric apparatuses, etc.; whose operation effects a setting up of vibration or unbalanced forces. In the operation of an engine, the vibration at certain speeds is more pronounced, although vibrations always exist during operation. The present invention is to overcome these vibrations and to prevent the accumulation of molecular vibrations for the critical speed.

The cause of critical vibrations lies in synchronism at high speeds, between vibration producing impulses and the natural rate of vibration of the shaft. These vibrations are due to the flexibility of the shaft. All shafts have a certain degree of elasticity, and consequently the shaft is subject to elastic deformations or angular deflections under the application of torque. Since the torque of an internal combustion engine is variable, it follows that the amount of angular deflection accordingly varies upon transmission of this torque to the shaft, thus causing said shaft to have torsional oscillations axially and radially.

When the frequency of the torsional oscillations and the vibrations of molecules are in accord with the natural vibration period of the crank shaft, the deflections are greatly increased, and, the result is increased vibration. The rear end of the crank shaft, in the ordinary construction of an engine, is restrained from rapid acceleration by the inertia of its flywheel. During rotation a torsional moment on the crank shaft is always present, but is rapidly increased in the immediate vicinity on any of the crank pins at the instant of the explosion in the cylinder. The crank shaft will twist slightly, and a moment later, as the torsional effect on the crank pin decreases, the crank shaft will unwind owing to its torsional elasticity. Thereafter, the torsional force of another crank pin will increase and cause the crank shaft to wind up again. In this torsional vibration there is also effected an axial movement of the crank shaft as well as a deflection of the crank shaft from its normal axial position.

In one cylinder engines there is slight axial vibration because of the shortness of the crank shaft.

The present invention is adaptable for an engine of any number of cylinders.

In a six cylinder engine, or an engine made up of a multiple of six cylinders, the primary, secondary and fourth harmonic unbalanced forces are canceled but there arises sixth harmonic unbalanced forces as well as the torsional unbalanced forces and the resonance vibrations.

In an eight cylinder engine, or an engine made up of a multiple of eight cylinders, the primary and secondary harmonic unbalanced forces are canceled, the fourth harmonic unbalanced forces, the torsional vibrations, and the resonance vibration are not dampened.

The present invention has for its object the provision of a device with my natural vibrationless means, to balance all the unbalanced forces automatically as well as to dampen vibrations at any speed, and in all directions in a revolving body.

The present invention has also for its object the provision of a balancer, and dampener with my natural vibrationless means, in which a balancing and dampening effect is brought about through radial and axial operation for counterbalancing the radial and axial forces present during the operation of engines, machines, vitaphones, etc.

The invention consists of the combination and arrangement of parts hereinafter described and claimed.

The invention will be best understood by a reference to the accompanying drawings which form a part of this specification and in which, Fig. 1 is a front elevation view of a part of an engine showing one form of the invention applied with parts in section and parts broken away.

Figure 1:
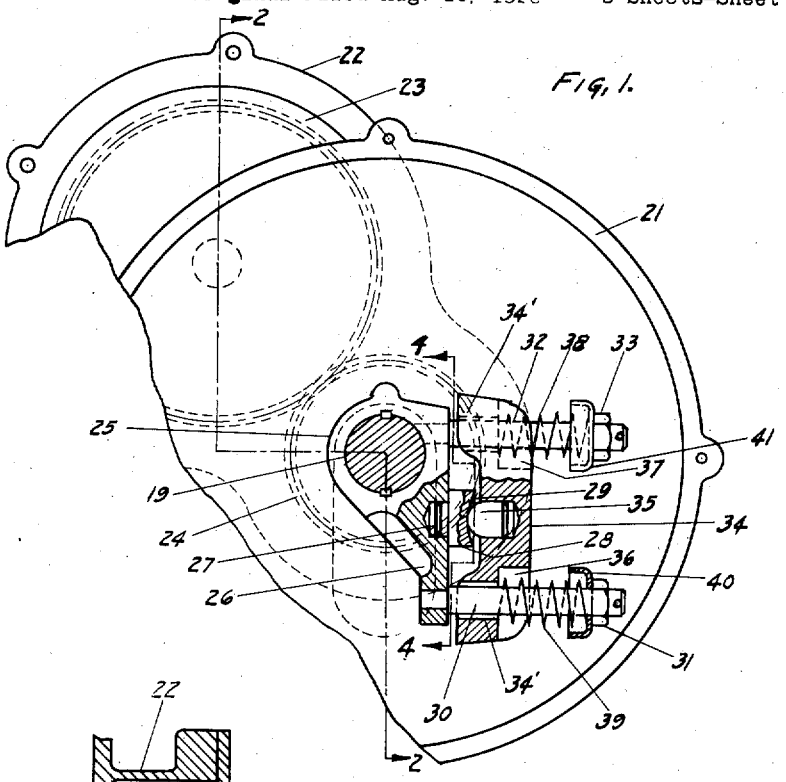
Figure 2:
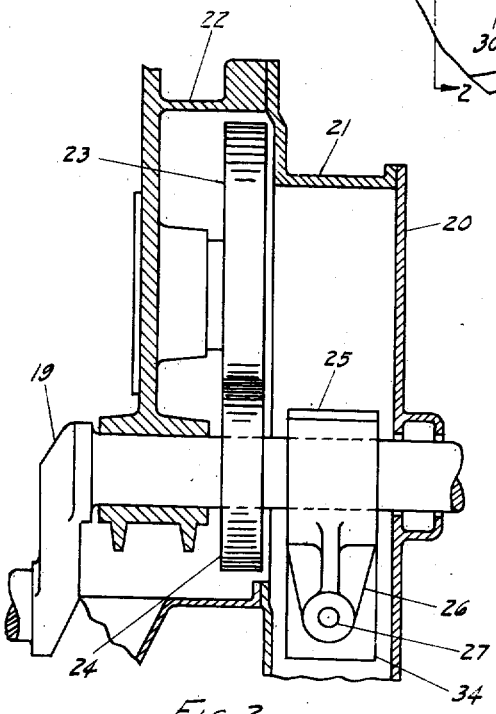
Fig. 2 is a fragmentary sectional view taken on substantially line 2—2 of Fig. 1.
Figure 3:
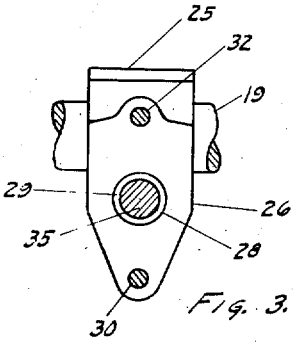
Fig. 3 is a fragmentary sectional view taken on substantially line 4—4 of Fig. 1.
Figure 4:
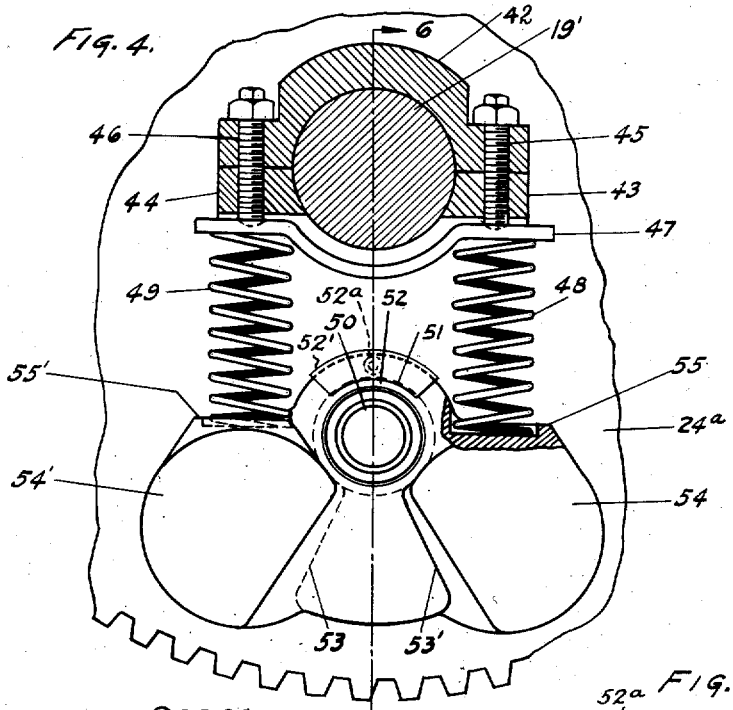
Fig. 4 is a front elevation view of a modified form of the invention showing it mounted on a shaft, and shown partly in section.

One form of my invention shown in Figs. 1, 2, and 3, a crank shaft 19 projects through the front wall 20 of a housing 21, which is positioned forward of the timing gear housing 22, the usual timing gears 23 and 24 being shown. Fixedly mounted upon the crank shaft 19, to rotate therewith is a collar 25, on one side of which is an arm 26, the collar and arm serving to form a bracket or carrying member rotatable with the crank shaft. Fixedly mounted in the bracket is a plug 27, having a head 28, in which is formed a concave depression or pocket 29. Projecting outwardly adjacent to the end of the arm 26 is a stud 30, which is threaded for the reception of the suitable nut 31. A similar stud 32 projects outwardly from the bracket at the opposite end, this stud 32 being also threaded for a nut 33. A counteracting or dampening inertia mass 34, used in this invention, may be termed a displaceable inertia mass, being provided with much large holes 34', for projecting studs 30 and 32 therethrough so that there is always a clearance between the studs and holes. Said displaceable inertia mass is provided with spherical contact member 35. Recesses 36 and 37 are formed in the opposite sides of said inertia mass to engage the ends of the springs 38 and 39. The opposite ends of said springs are held in cups 40 and 41, to overcome any displacement of the center-line of said springs and to prevent the natural vibration of the springs, to overcome the resonance vibrations, and to increase the resistance of the springs to respond to vibrations at all speeds. Through this arrangement or like manner by preventing any displacement of said springs the natural vibrations of the studs 30 and 32 are also dampened. The springs 38 and 39, and cups 40 and 41, are retained in position by means of nuts 31 and 33, or other means, for instance by rivets.

It is evident that turning the nuts 31 and 33 will change the pressure of the springs 38 and 39, so that the inertia mass 34 is always displaceable therebetween on its contact point 35, which point may be varied. The structure is such, that the inertia mass 34 may be displaced on its contact point 35, against the resistance of either of the springs 38 and 39. A swinging longitudinally of the inertia mass 34 effects an additional compression to the spring 38, and a swinging of said mass in another longitudinal direction puts an additional pressure to the spring 39. The said inertia mass may also be displaceable transversely on its contact point 35, which point varies, and induces an additional force upon said inertia mass to be transmitted to the springs 38 and 39 under normal conditions.

It will be noted in Fig. 1, that one side of said inertia mass is positioned a greater distance from the center-line of its rotation, than the opposite side, so that said inertia mass will be slightly tilted on its contact point 35. As the various unbalanced forces and vibrations are transmitted through the crank shaft 19, to the natural vibrationless springs 38 and 39, the state of inertia of said mass, with the co-operation of the springs will concentrate, neutralize, dampen, and oppose the unbalanced and vibrating forces of the crank shaft 19.

In operation the inertia mass 34 is held in its plane of rotation by the natural vibrationless springs 38 and 39, which springs respond to the torsional vibrations, said vibrations tending to displace the center-line of the revolving shaft 19, either through whipping, twisting, or bending said shaft or any other way striving to move the center-line of said shaft out of its plane of rotation. Since the inertia mass 34 is held by said natural vibrationless springs in its plane of rotation, and said springs are so connected to the carrying member to revolve with the shaft 19. Therefore the inertia mass will concentrate, neutralize and oppose said forces in its plane of rotation.

In the form shown in Figs. 4, 5, 6, 7, and 8, the same forces are applied for balancing and dampening as were called into play in the device as described and illustrated with Figs. 1, 2, and 3. The revolving part of the shaft 19' has a collar 42, which is connected to the blocks 43 and 44 by means of screws 45 and 46. These screws serve to bind the collar on the shaft 19' and to rotate therewith. An engagement member 47, which formed arcuately at its ends for connecting the ends of the screws 45 and 46, and one end of the coil springs 48 and 49 on which they are located and squared, so that misalignment of the ends of said springs is prevented.

Figure 5:
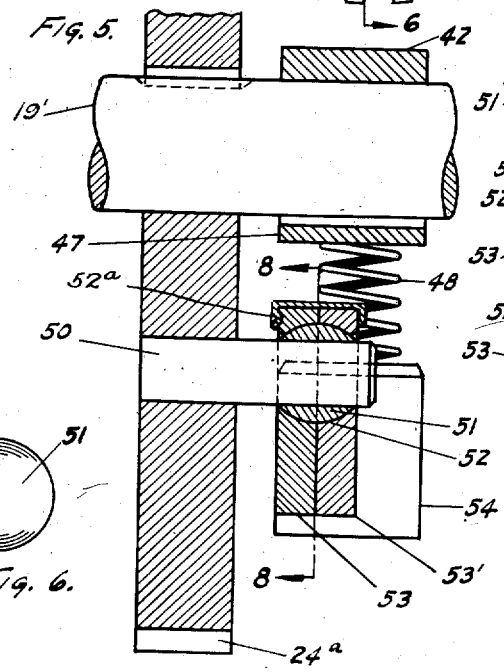
Fig. 5 is a fragmentary sectional view taken on substantially line 6—6 of Fig. 4.
Figure 6:
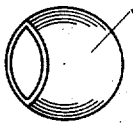
Fig. 6 is a perspective view of a ball used in the invention.
Figure 7:
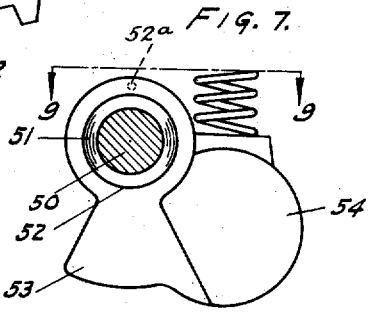
Fig. 7 is a fragmentary section view taken on substantially line 8—8 of Fig. 5.
Figure 8:
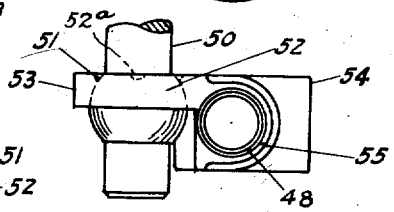
Fig. 8 is a fragmentary view taken on substantially line 9—9 of Fig. 7.

As shown in Fig. 5 the revolving part of a shaft 19' projects through the gear 24[a], and a stud 50 is fixedly mounted thereon. A lock ring 51 is attached to said stud, which ring is positioned in an opening 52, which is formed in the inertia masses 54 and 54', said masses comprising the reduced portion 53 and 53'. The thicker portions 54 and 54' are provided with pockets 55 and 55', and in these pockets the other ends of the springs 48 and 49 are squared and guided against any displacement of their center-lines. The reduced portions 53 and 53' overlap each other, which is clearly shown in Fig. 4. These masses are mounted on the lock ring 51 and are held together by a flexible clip 52', said clip is retained in position by means of a notch 52[a], or other means; thus a universal movement of said masses is attained against the compression or tension of the springs 48 and 49. Axial movement is also insured for said masses against the resistance of said springs, because the lock ring 51 is slidable on the stud 50; any or all of these movements are limited and resisted by the natural vibrationless springs. One method to control the natural vibrations of flexible means has been described and illustrated by Figs. 1, 2, and 3.

When the said part revolves with the inertia masses 54 and 54', these masses are in their plane of rotation at right angles to the axis of said part, and are capable of swinging universally, and at the same time capable of an independent radial motion. All of these movements are limited and resisted by the springs, whose natural vibrations are prevented and dampened, so that the torsional and other vibrations are concentrated, neutralized, and dampened in their plane of rotation.

Figure 9:
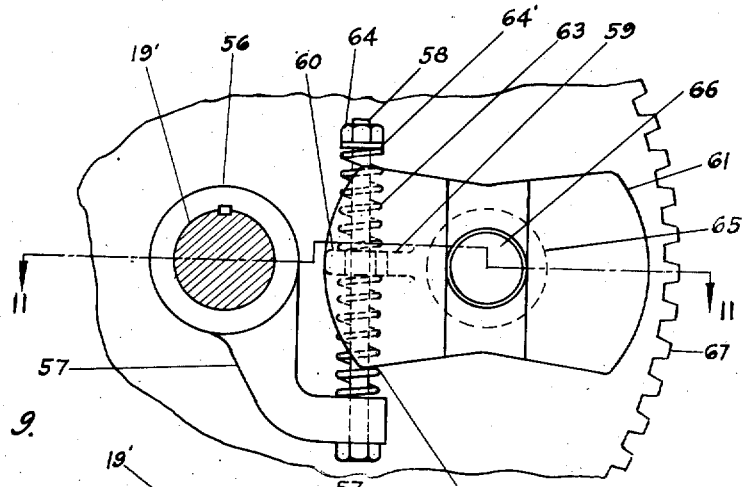
Fig. 9 is a front elevational view of a further modified form of the invention showing it applied to a shaft, and shown in fragment.
Figure 10:
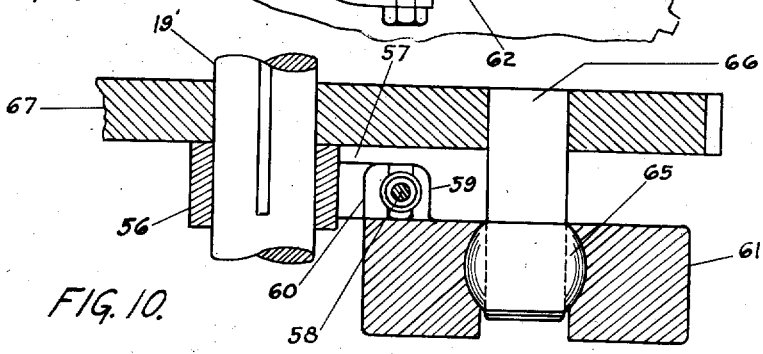
Fig. 10 is a fragmentary sectional view taken on substantially line 11—11 of Fig. 9.

In Figs. 9 and 10, I have shown a further modified form of my invention, in which there is mounted fixedly upon a revolving part of a shaft 19', a ring 56, and an arm 57 projecting therefrom, forming a bracket, through which the bolt 58 extends, and is positioned between a pair of lugs 59 and 60, and extending from the inertia mass 61.

A bolt 58 is positioned in the core of the coil springs 62 and 63. The ends of said springs are squared and guided, to prevent any displacement of said springs, to minimize the defection thereof. So that the natural vibrations of said springs are dampened.

The said lugs are positioned between the other ends of the springs 62 and 63, the pressure or tension of these springs on the lugs 59 and 60 being determined by nuts 64, which is on the bolt 58, with or without washer 64'.

The inertia mass 61 is mounted on a spherical lock ring 65, so as to have a universal movement thereon, this lock ring being positioned on a stud 66, which projects from one side of the gear 67. Therefore said inertia mass is movable radially as well as universally at the same time.

When the said part rotates with the shaft 19', the arm 57 will rotate in unison therewith as will also the gear 67, carrying with it the mass 61. When the impulses of the vibrating forces are transmitted to the inertia mass 61, through the natural vibrationless springs 62 and 63, said mass has all direction movements between said springs in its plane of rotation. The direction of these displacements is dependent upon the direction in which the forces are transmitted and the nature of the vibrating forces, which are being concentrated, neutralized, dampened, and minimized with the resistance of the inertia mass 61 and the spring controlled means; so that said controlled means will resist any or all vibrating forces at all speeds.

With the various forms illustrated, the advantages and features of my invention are believed shown in a manner practically adaptable to engines of various types. A practical and simple method is illustrated for overcoming the unbalanced harmonic forces, and torsional vibrations and such other vibrating forces as may exist in any engine, machine, vitaphone, etc., where it is desirable to reduce such vibrations and other vibrations with the natural vibrationless flexible means.

It is understood that the assembled device must be balanced statically and running, or when it is assembled with the rotating part.

My device remedies, simultaneously or otherwise, all unbalanced forces tending to cause vibration at any time, because its axial, radial and universal movements are limited by flexible or yieldable means, whose natural vibrations are prevented and dampened, and is for this reason new.

While I have illustrated and described the preferred form of my invention, I do not wish to limit myself to the precise form of structure shown, but desire to avail myself of such variations and modifications as may come within the scope of the appended claims.

Having thus described my invention, what I claim as new and desire to secure by Letters Patent is:

1. A vibration damper for a shaft consisting of a supporting member adapted to be secured to said shaft, radial spaced rod elements thereon, a spherical concave seat mounted on said supporting member intermediate said rod elements and eccentric to its axis of rotation, a displaceable inertia member having apertures of much larger diameter than that of the rod elements passing therethrough, a spherical convex projection secured to said inertia member and abutting said concave seat, retaining means on said rod elements and natural-vibrations-controlled resilient means between said inertia member and retaining means for connecting the spherical convex projection to said concave seat.

2. A vibration damper for a shaft consisting of a supporting member adapted to be secured to said shaft, radial spaced rod elements thereon, a spherical concave seat mounted on said supporting member intermediate said rod elements and eccentric to its axis of rotation, a displaceable inertia member having apertures of much larger diameter than that of the rod elements passing therethrough, a spherical convex projection secured to said inertia member and abutting said concave seat, retaining means on said rod elements and natural-vibrations-controlled resilient means for connecting said inertia member and retaining means, to limit the axial and radial displacements of said convex projection on said concave seat.

3. A vibration damper for a shaft consisting of a supporting member adapted to be secured to said shaft, radial spaced rod elements thereon, a spherical concave seat mounted on said supporting member intermediate said rod elements and eccentric to its axis of rotation, an inertia member displaceable axially and radially thereon, having apertures of much larger diameter than that of the rod elements passing therethrough, a spherical convex projection secured to said inertia member and abutting said concave seat, retaining means on said rod elements and natural vibrations controlled resilient means between said inertia member and retaining means for connecting said convex projection to said concave seat.

ALEXANDER J. BOCZ.